Aug. 30, 1955

A. HARRISON, SR., ET AL 2,716,402

MASONRY CUTTING MACHINE

Filed June 1, 1954

INVENTORS:
Albert Harrison Sr., & Albert Harrison Jr.,
BY George D. Richards
Attorney Aug. 30, 1955 A. HARRISON, SR., ET AL 2,716,402
MASONRY CUTTING MACHINE
Filed June 1, 1954 4 Sheets-Sheet 2
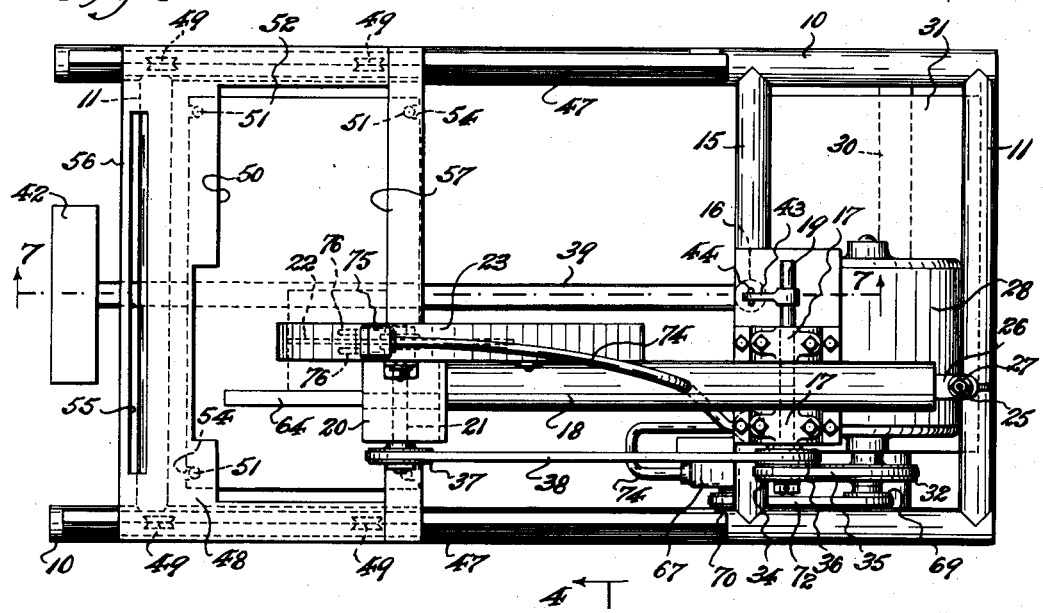
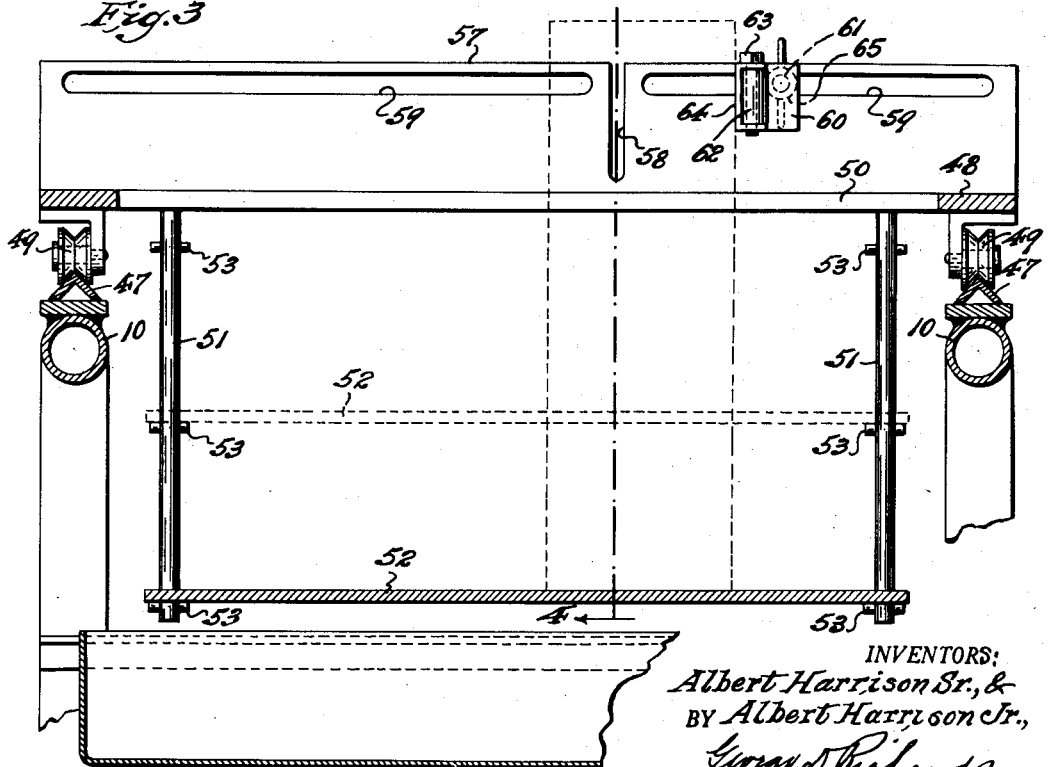
INVENTORS:
Albert Harrison Sr., &
BY Albert Harrison Jr.,
George D. Richards
Attorney Aug. 30, 1955  A. HARRISON, SR., ET AL  2,716,402
MASONRY CUTTING MACHINE
Filed June 1, 1954  4 Sheets-Sheet 3
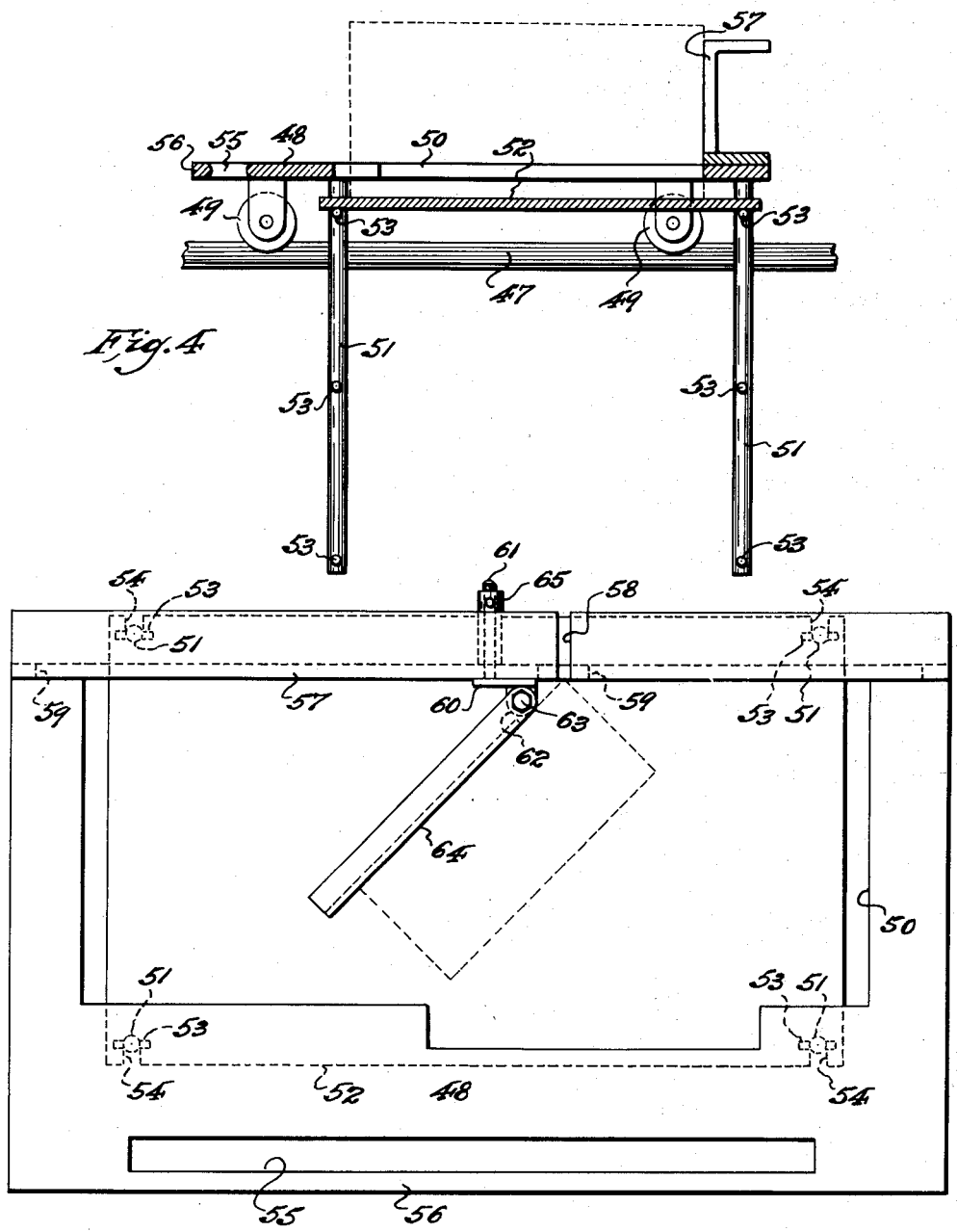
INVENTORS:
Albert Harrison Sr. & Albert Harrison Jr.,
BY George D. Richards
Attorney

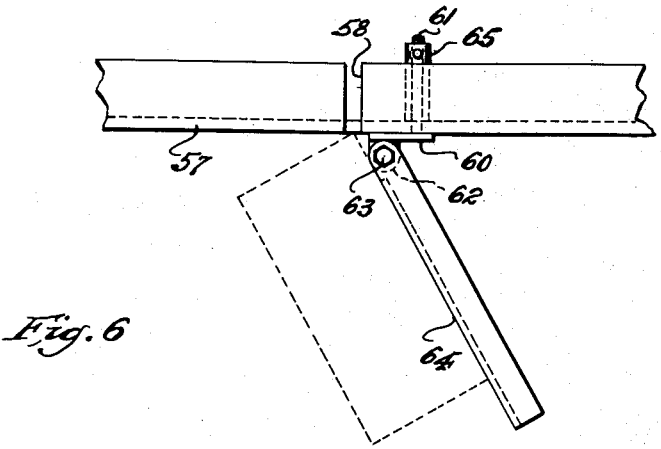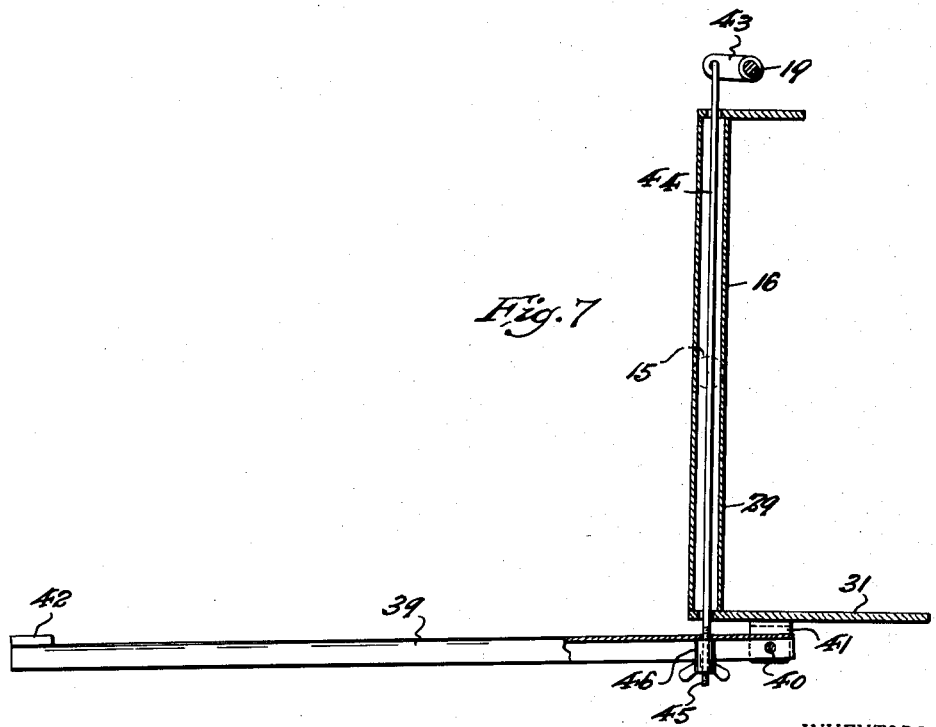

United States Patent Office 2,716,402
Patented Aug. 30, 1955

2,716,402

MASONRY CUTTING MACHINE

Albert Harrison, Sr., Lyndhurst, and Albert Harrison, Jr., Newark, N. J.

Application June 1, 1954, Serial No. 433,535

9 Claims. (Cl. 125—13)

This invention relates to improvements in machines for cutting tile, terra cotta and other masonry blocks and pieces.

This invention has for an object to provide, in a masonry cutting machine having a rotatable cutting disc and means to drive and control the same, a novel construction and arrangement of work handling carriage by which the work is so firmly supported against the cutting thrust of the cutting disc during a cutting operation that accidental displacement of the work, with risk of injury to the operator, is substantially avoided.

More specifically, this invention has for an object to provide, in a masonry cutting machine, a track guided work carriage which is adapted to be manually operated whereby to carry the work to and for cutting engagement by the rotary cutting disc of the machine, said carriage comprising a main platform having a well opening therein, a work supporting well floor member beneath said well opening, and means to suspend said floor member from the main platform at various selected levels for desired disposition of the work to be operated upon; said main platform having a work back stop member mounted thereon across its rear or inner end and bordering the rear or inner margin of the wall opening thereof, which, as so disposed, braces the work against accidental shift or displacement under the cutting thrust of the rotated cutting disc.

This invention has for another object to provide adjustable means, in combination with the back stop member of the carriage platform, for holding the work in selected position relative to the machine cutting disc subject to either straight or angular cutting thereof.

This invention has for a further object to provide improved means for driving and controlling the rotary cutting disc of the machine.

The above and other objects will be understood from a reading of the following description of an illustrative embodiment of this invention in connection with the accompanying drawings thereof, in which drawings:

Fig. 2 is a top plan view thereof.

Fig. 3 is a fragmentary cross-sectional view, taken on line 3—3 in Fig. 1, but drawn on an enlarged scale; and Fig. 4 is a fragmentary longitudinal sectional view, taken on line 4—4 in Fig. 3.

Figure 1:
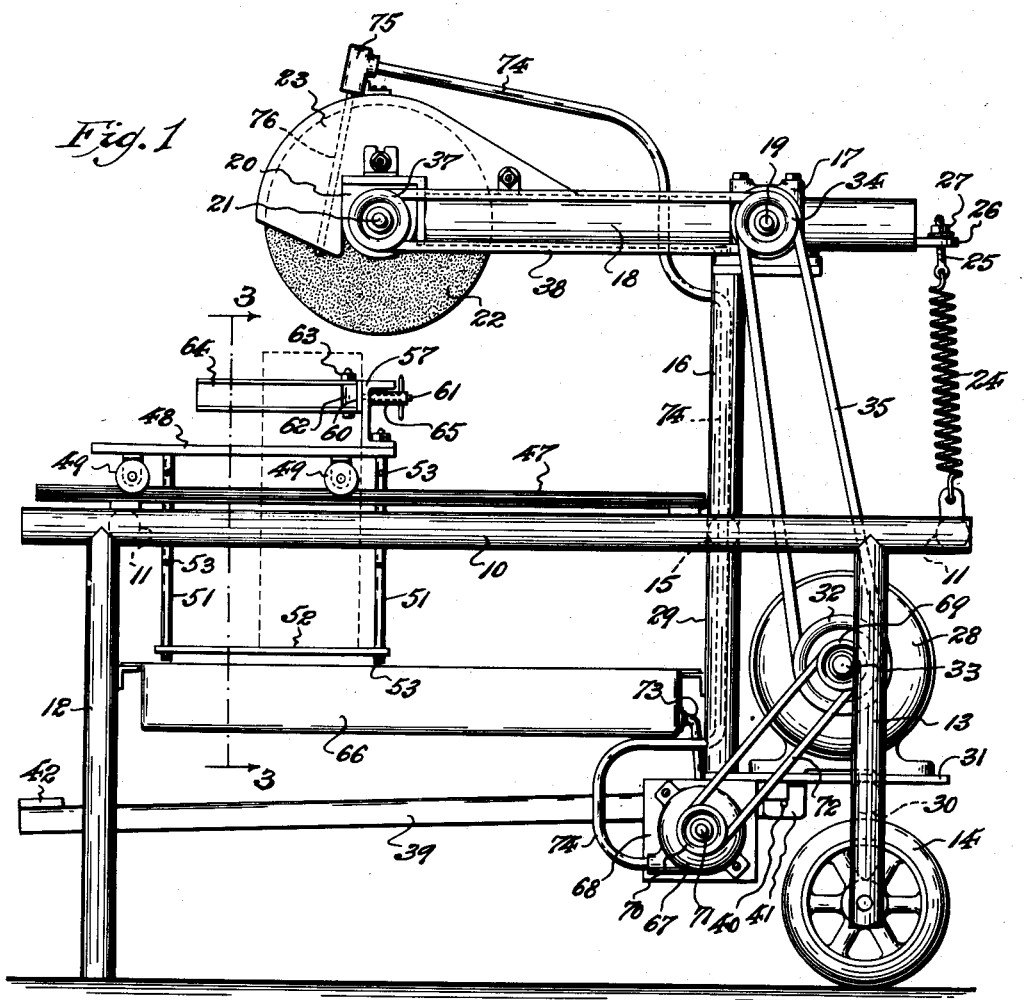
Fig. 1 is a side elevational view of a masonry cutting machine according to this invention.

Fig. 5 is a top plan view of the work carriage of the machine on an enlarged scale, and showing the means for holding the work as arranged to dispose said work for angular cutting thereof in one direction; and Fig. 6 is a fragmentary view, similar to that of Fig. 5, but showing the means for holding the work as arranged to dispose said work for angular cutting thereof in another direction. Fig. 7 is a fragmentary longitudinal sectional view, taken on line 7—7 in Fig. 2.

Referring to the drawings, in which like characters of reference denote corresponding parts, the operative parts of the machine are supported by a framework comprising a rectangular top frame formed by longitudinal side members 10 and transverse end members 11. Said top frame is supported by front legs 12 and rear legs 13. In order to facilitate moving the machine from one location of use to another, wheels 14 are preferably mounted on the rear legs 13 of the machine framework. Forwardly of its rear end, the top frame is provided with an intermediate transverse member 15 which supports a pair of suitably located, laterally spaced apart, vertical standards 16 by which rearwardly offset, transversely aligned bearing members 17 are supported.

The cutting mechanism of the machine comprises a beam 18 pivotally supported so as to be oscillatable in vertical plane. Said beam 18 is preferably of tubular form, and is affixed upon a rock shaft 19 which pivotally supports the same intermediate its forward and rearward ends, said rock shaft 19 being journaled in and between the aforesaid bearing members 17. The beam 18 is provided at its forward end with a bearing means 20 in which is journaled the arbor 21 of a rotatable cutting disc 22. Said cutting disc 22 ordinarily comprises a circular body of abrasive material, such as carbon silicide or the like, and is made of selected thickness according to the width of kerf desired to be produced by its cutting action. The upper part of the cutting disc 22 is enclosed in a protective guard housing or hood 23 of suitable shape, and suitably affixed to the beam 18. The lower part of the cutting disc 22 projects freely downward and externally beyond the open bottom of the guard housing or hood 23. The beam 18, with the cutting disc 22 carried thereby, is yieldably biased to an upswung normal initial position by means of a pull spring 24, which is interconnected between the rear end of said beam 18 and the rear end member 11 of the top frame of the machine framework, thus substantially counterbalancing the weight of the forward arm of the beam 18 and the cutting disc 22 carried thereby. It is desirable to provide means for adjusting the tension of the pull spring 24, whereby to regulate the counterbalancing force and effect of the pull spring. To this end, said pull spring 24 is suitably anchored by its lower end to the machine framework, while its upper end is coupled to a screw-threaded eyebolt 25 which extends upwardly through a perforate tail-piece 26 with which the rear end of the beam 18 is provided. Threaded onto the free end of said eyebolt, to bear against the tail-piece 26, is a nut 27. Said nut 27 can be manipulated to adjust said eyebolt, whereby to increase or decrease the tensional force of the pull spring 24 as may be desired.

Supported by the machine framework is an electric motor 28 to serve as a source of power for driving the rotatable cutting disc 22. An illustrative means for supporting said motor 28 comprises members 29 which depend from the intermediate member 15 of the machine framework, and a transverse bridge bar 30 which is affixed to and between the rear legs 13 of said framework. Secured to the lower ends of said dependent members 29 to extend rearwardly therefrom and over said bridge bar 30, is a shelf plate 31. The motor 28 is suitably mounted on and supported by said shelf plate.

The means for transmitting the power of said motor 28 to the cutting disc 22 comprises pulley and belt or equivalent transmission means so articulated at the pivotal point of the cutting disc beam 18 as not to interfere with necessary oscillatory swing of the latter. An illustrative form of such articulate transmission, as shown, comprises a drive pulley 32 fixed on the motor armature shaft 33, a driven pulley 34 rotatably supported on an end portion of the rock-shaft 19 of the cutting disc carrying beam 18, a transmission belt 35 connecting said motor actuated drive pulley 32 with said driven pulley 34, a secondary drive pulley 36 also rotatably supported on said rock-shaft 19 and affixed to said pulley 34 so as to be driven thereby, a driven pulley 37 fixed on the arbor 21 of the cutting disc 33, and a transmission belt 38 connecting said drive pulley 36 with said arbor pulley 37. It will be obvious, since the pulleys 34 and 36 rotate about the axis of the rock-shaft 19 by which the cutting disc beam 18 is pivoted, that the described transmission will not interfere with up and down swinging movements of the cutting mechanism, while nevertheless effectively driving the cutting disc.

Operative down swinging movement of the cutting disc beam 18, whereby to carry the cutting disc 22 into cutting engagement with work submitted thereto, is controlled by foot treadle means. This foot treadle means comprises a treadle lever 39, the rear end of which is pivotally supported by a pivot pin 40 carried by a bracket 41 which is affixed to the shelf plate 31 to depend from its under side. From such pivotal support, the treadle lever extends forwardly through the lower part of the machine framework, with its forward free end accessible to an operator stationed at the forward end of the machine. Affixed to the forward free end of the treadle lever 39 is a suitable treadle foot piece 42. The rock-shaft 19, by which the cutting disc beam 18 is pivoted, is provided with a forwardly projecting lever arm 43. A connecting rod 44 extends downwardly from said lever arm 43 to and through the treadle lever 39, forwardly of its pivotal support, for coupled attachment thereto. It is preferable to so couple the connecting rod 44 to the treadle lever 39 that adjustment can be made for regulating the effective stroke of the foot treadle means. To this end, the lower end portion of the connecting rod is provided with external screw threads 45, and applied to such threaded end portion 45 is a coupling nut 46 which is adapted to abut the underside of the treadle lever. Adjustment of said nut 46 up or down will desirably predetermine the normal initial upswung position of the treadle lever, and thus the scope of its operative stroke. If the standards 16 are of tubular form, the connecting rod 44 can extend through the interior of one thereof, as shown (see Fig. 7).

The means for supporting and feeding the work subject to cutting engagement thereof by the cutting disc 22 is provided by a track guided work carriage of novel form and construction, which is manually movable toward and from the path of operative descent of the cutting disc. Mounted on the side members 10 of the top frame of the machine framework are longitudinal track members 47, which are preferably of inverted V-shape in cross-section. The work carriage comprises a horizontal main platform 48 of suitable length which bridges the top frame of the machine framework, and which is supported for movement along the track members 47 by peripherally grooved wheels 49, the latter being mounted upon the underside of said main platform 48. The main platform 48 is provided with a well opening 50 of suitable width, length and shape. Affixed to the main platform 48, to depend therefrom adjacent to the corners of the well opening 50, are perpendicular hanger bars 51 by which a well floor member 52 is suspended from said main platform beneath the well opening 50 and in horizontal plane parallel thereto.

Means is provided for selectively engaging the well floor member 52 with the hanger bars 51, whereby to position the former at a level selectively spaced relative to the main platform 48 which is best suited to support work to be operated upon according to its size and shape, and so as to best dispose the part thereof in which a cut is desired to be made. Various means can be provided for so adjusting the well floor member upon the hanger bars to which it is supported. In one illustrative arrangement of means for such purpose, as shown, the hanger bars 51 are respectively provided with vertically spaced cross pins 53, which extend diametrically therethrough for lateral projection therefrom in directive parallel to the front and rear margins of the well floor member 52. The front and rear marginal portions of the well floor member are indented by notches 54 to straddle the hanger bars 51. When the well floor member is applied to the hanger bars so as to rest upon the lowermost set of cross-pins 53, the same defines a carriage well of maximum depth (see Figs. 1 and 3), and when said well floor member is shifted to rest upon the uppermost set of cross-pins, the same defines a carriage well of minimum depth (see Fig. 4). A carriage well of intermediate depth is produced by engaging the well floor member with a set of intermediate cross-pins (see broken line representation of the well floor member in Fig. 3). The number and spacing of the sets of well floor member supporting cross-pins can be varied as may be desired.

Provided in the forward marginal end portion of the main platform 48 of the work carriage is a transverse slot 55 which defines a hand hold bar 56 adapted to be grasped by the operator for manually controlling the movements of the work carriage.

Fixed upon and across the rearward or inner end of the main platform 48 of the work carriage, so as to border the rear or inner margin of the well opening 50 thereof, is an upstanding backstop member 57. This backstop member preferably comprises a channel iron disposed with the outer face of its web wall aligned with said rear or inner margin of said well opening 50. Formed in the backstop member 57, so as to be aligned with the path of operative descending movement of the cutting disc 22, is an upwardly open vertical slot 58 into which the descending cutting disc 22 can enter during the cutting operation exercised thereby upon work submitted to its cutting action.

Provided in the upper portion of the backstop member 57, adjacent and parallel to its top edge are longitudinal slots 59 which respectively extend from points adjacent to the vertical clearance slot 58 outwardly toward the respective ends of the backstop member. Cooperative with the backstop member 57 is means for holding the work, when backed thereby, in selected position according to the direction of cut to be made therein. This holding means is selectively attachable to the backstop member in various positions as required, and comprises a base plate 60 having an externally screw-threaded stud 61 projecting rearwardly therefrom perpendicular to the plane thereof. Projecting from the front face of the base plate 60 is a knuckle member 62, and pivotally connected with said knuckle member, by a combined pivoting and clamp bolt 63, is a work bracing or holding member 64. In use, the work holding member 64 is mounted, in required location, on the backstop member 57 to extend outwardly from the front face thereof over the main platform of the work carriage. To so mount the work holding member, the base plate 60 thereof is abutted against said face of the backstop member with the stud 61 projecting rearwardly through a slot 59. A clamp nut 65 is tightened home on said stud 61, thus clamping the work holding member in place. The thus mounted work holding member 64 can be swung to any required angular position, and then secured therein by tightening home the pivoting and clamp bolt 63.

Means is provided for circulating a lubricating liquid for delivery to the operating cutting disc 22 and the work undergoing a cutting operation thereby. In an illustrative form thereof, as shown, means for this purpose comprises a catch basin 66, which is suitably mounted in the machine framework beneath the work carriage and the cutting disc. A rotary pump 67 is also suitably mounted in connection with the machine framework, as e. g., by a supporting bracket structure 68 secured to the underside of the shelf plate 31. The pump 67 is driven by the motor 28 by means of a belt and pulley transmission comprising a drive pulley 69 on the motor generator shaft, a driven pulley 70 on the pump shaft 71, and a transmission belt 72 running over said pulleys. Leading from the catch basin 66 to the intake side of the pump 67 is a lubricating liquid return conduit 73. Leading from the discharge side of the pump 67 is a lubricating liquid delivery conduit 74. This lubricating delivery conduit 74 may be conveniently arranged to extend to and upwardly through tubular members 16—29 of the machine framework, thence to and through the cutting disc carrying beam 18, and thence to a header member 75 which is mounted on the top of the guard housing or hood 23 by which the upper part of the cutting disc 22 is enclosed. Extending downwardly from the header member 75 into the interior of the guard housing or hood, respectively adjacent opposite sides of the cutting disc 22, are lubricant liquid discharge nozzles 76, from which circulated lubricant liquid is discharged onto the cutting disc 22 and onto the work undergoing a cutting operation thereby. The discharged lubricating liquid drains back into the catch basin 66, whence its continued circulation is effected by the pump.

The provision, in the masonry cutting machine of this invention, of a work carriage having a well of adjustable depth to accommodate masonry pieces of various dimensions, and said carriage also having a work backstop member 57 at its rear or inner end which is operative to brace the work against the cutting thrust of the cutting disc 22, which rotates in counterclockwise direction, assures elimination of much risk, both of injury to the machine operator and spoilage of the work, due to accidental displacement of the latter from required position thereof to produce a desired cut therein during the cutting operation. By reason of the permissive adjustment of the depth of the work carriage well, the masonry piece deposited therein can be disposed in most advantageous position, and so that, in any selected disposition thereof, the portion or area in which a cut is to be made, extends upwardly beyond the top edge of the backstop member 57 but a short distance, usually approximately but two inches. Due to this, the masonry piece operated upon is firmly and solidly backed against the cutting thrust of the cutting disc, at the very portion or area of said piece which is subjected to the cutting action, and consequently risk of tipping or other displacement or shift under cutting disc thrust is strongly resisted. The masonry piece operated upon is additionally supported against accidental displacement or shift by the holding member 64, which therefore likewise contributes a safety factor during operation of the machine, as well as means to hold the piece in position for subjection of the same to a cut of selected angular direction.

Illustrative of the above stated advantages, assume that it is desired to make a cut in the end of a hollow tile or like masonry block having a length dimension of eighteen inches. In such case, the well floor member 52 is mounted on the supporting hanger bars 51 in its lowermost position, and the tile or block is deposited thereon, to stand upright on end, for upward extension through the well opening 50 of the main platform 48 of the carriage, and so that its upper end portion, in which the cut is to be made, is backed by the backstop member 57, and projects somewhat above the top of the latter, subject to engagement by the cutting disc 22. In such case, the holding member 64 is adjusted and fixed to extend at a right angle from the face of the backstop member 57, thus bracing the tile or block against sidewise shift (see broken line representation of the tile or block in Figs. 1, 2 and 3). With the tile or block thus supported and braced by the work carriage, the latter is moved forward by the operator, to carry the tile or block into the path of the rotated cutting disc 22, then by actuating the foot treadle means, the operator causes the rotated cutting disc 22 to descend and make cutting contact with the tile or block as advanced by the work carriage. It will be obvious, under these conditions, that the cutting thrust of the counter-clockwise rotated cutting disc tends to urge the tile or block against the backstop member 57, whereby the latter braces said tile or block against accidental displacement under such cutting thrust. If it is desired to make a similar end cut in a tile or block having a length dimension of twelve inches, the well floor member 52 is mounted on the supporting hanger bars 51 in an intermediate position shown by broken lines in Fig. 3.

If it is desired to effect a rip cut longitudinally of a masonry tile or block, the well floor member 52 is mounted on the supporting hanger bars 51 in its uppermost position (see Fig. 4). Such upper level position of the well floor member 52 can also be utilized to support the tile or block subject to a cross cut therein. If such cross cuts are desired to be of oblique angular character, the holding member 64 can be adjusted, for corresponding angular disposition, in connection with the backstop member 57 (see Figs. 5 and 6).

To operate upon relatively thin or odd sizes of masonry pieces, of dimensions not suitable for accommodation by an adjusted position of the well floor member 52, a cover plate or auxiliary platform (not shown) can be overlaid upon the main platform 48 of the carriage, so as to cover the well opening 50 thereof, whereupon such masonry pieces can be supported upon the applied cover plate or auxiliary platform.

Having now described our invention, we claim:

1. In a masonry cutting machine having a rotatable cutting disc and means to drive and control operation thereof, a manually operative track guided work carriage adapted to carry the work into engagement with the cutting disc, said carriage comprising a main platform having a well opening therein, a work supporting well floor member, means to suspend said well floor member from said main platform beneath the well opening thereof, and means mounted on said main platform to hold and brace the supported work against the cutting thrust of the cutting disc.

2. In a masonry cutting machine having a rotatable cutting disc and means to drive and control operation thereof, a manually operative track guided work carriage adapted to carry the work into engagement with the cutting disc, said carriage comprising a main platform having a well opening therein, a work supporting well floor member, means to suspend said well floor member from said main platform beneath the well opening thereof, means to connect said well floor member with said suspending means at various selected spaced levels relative to said main platform, and means mounted on said main platform to hold and brace the supported work against the cutting thrust of the cutting disk.

3. In a masonry cutting machine having a rotatable cutting disc and means to drive and control operation thereof, a manually operative track guided work carriage adapted to carry the work into engagement with the cutting disc, said carriage comprising a main platform having a well opening therein, a work supporting well floor member, means to suspend said well floor member from said main platform beneath the well opening thereof, and a work back stop member upstanding across the rear end of said main platform in bordering relation to the rear margin of its well opening, said backstop member having a vertical clearance slot for the cutting disc.

4. In a masonry cutting machine having a rotatable cutting disc and means to drive and control operation thereof, a manually operative track guided work carriage adapted to carry the work into engagement with the cutting disc, said carriage comprising a main platform having a well opening therein, a work supporting well floor member, means to suspend said well floor member from said main platform beneath the well opening thereof, means to connect said well floor member with said suspending means at various selected spaced levels relative to said main platform, and a work backstop member upstanding across the rear end of said main platform in bordering relation to the rear margin of its well opening, said backstop member having a vertical clearance slot for the cutting disc.

5. In a masonry cutting machine according to claim 4, including an additional work holding means, means to mount said additional work holding means in selected location on said backstop member for extension therefrom over the work carriage, and means to selectively predetermine the angle of extension of said additional work holding means.

6. A masonry cutting machine comprising a framework including a top frame having longitudinal track members mounted thereon, a manually movable work carriage supported by said track members, laterally spaced standards upstanding from said top frame and provided with bearing members, a rock-shaft journaled by said bearing members, a beam pivoted by said rock-shaft, a rotatable cutting disc carried by the forward end of said beam, means cooperative with the rearward end of said beam to counterbalance the cutting disc to normal uplifted position, foot treadle means for down swinging said beam and cutting disc toward the work carriage, power transmission means for driving the cutting disc, said work carriage comprising a wheeled main platform mounted on said track members, said main platform having a well opening therein, a work supporting well floor member, means to suspend said well floor member from said main platform beneath the well opening thereof, means to connect said well floor member with said suspending means at various selected spaced levels relative to said main platform, and a work backstop member upstanding across the rear end of said main platform in bordering relation to the rear margin of its well opening, said backstop member having a vertical clearance slot for the cutting disc.

7. A masonry cutting machine according to claim 6 including lubricating liquid circulating means operative to supply the lubricating liquid to the cutting disc and the work subjected to the cutting action thereof.

8. A masonry cutting machine according to claim 6 including an additional work holding means, means to mount said additional work holding means in selected locations on said backstop member for extension therefrom over the work carriage, and means to selectively predetermine the angle of extension of said additional work holding means.

9. A masonry cutting machine according to claim 8 including lubricating liquid circulating means operative to supply the lubricating liquid to the cutting disc and the work subjected to the cutting action thereof.

References Cited in the file of this patent

UNITED STATES PATENTS

| | | |
|---|---|---|
| 2,171,024 | Coates | Aug. 29, 1939 |
| 2,247,183 | Bour | June 24, 1941 |
| 2,330,510 | Moffat et al. | Sept. 28, 1943 |
| 2,399,239 | Martin | Apr. 30, 1946 |
| 2,418,738 | Talboys | Apr. 8, 1947 |
| 2,450,371 | Coates | Sept. 28, 1948 |
| 2,591,206 | Scott | Apr. 1, 1952 |